March 31, 1964     A. A. ANDERSEN     3,127,329
METHOD AND APPARATUS FOR SAMPLING AIRBORNE MICRO-ORGANISMS
Filed Sept. 5, 1961     3 Sheets-Sheet 1
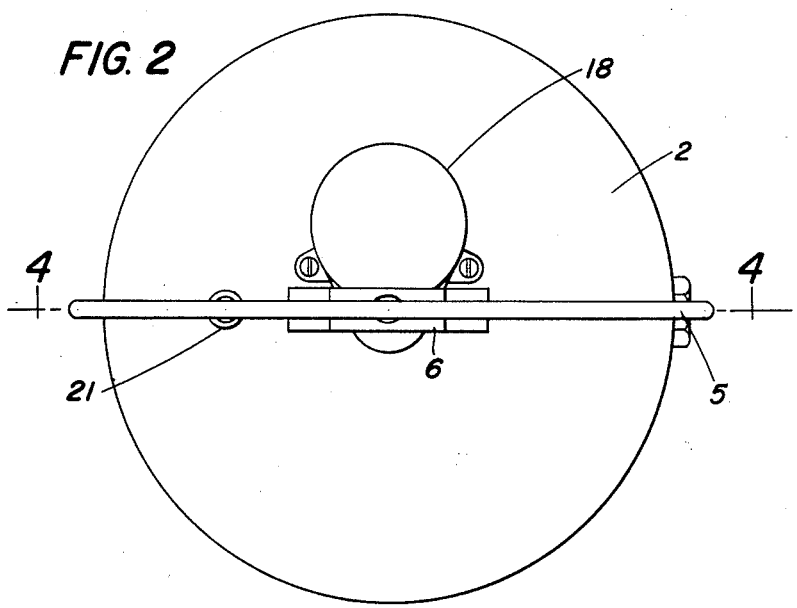
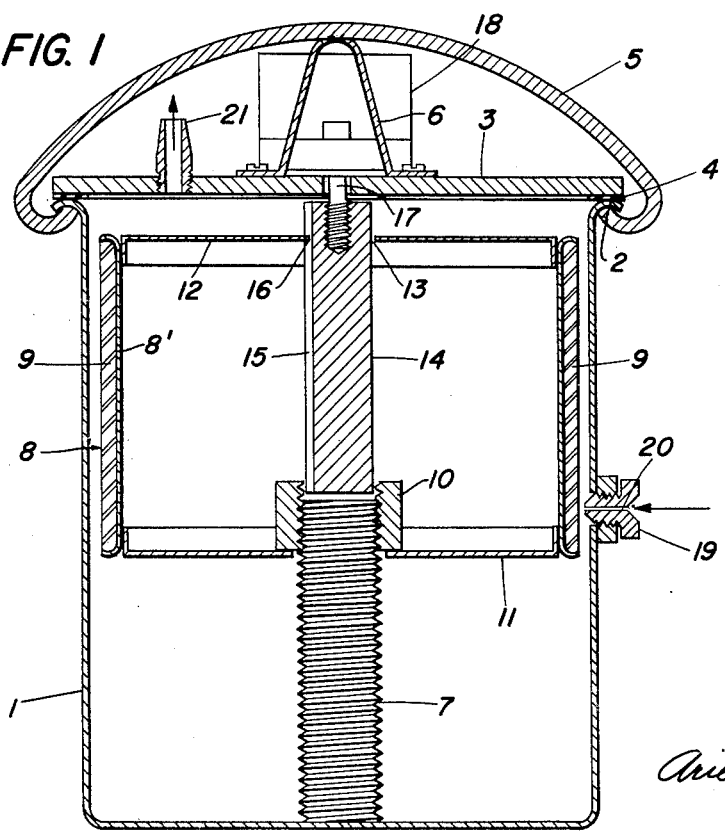
INVENTOR.
Ariel A. Andersen March 31, 1964 A. A. ANDERSEN 3,127,329
METHOD AND APPARATUS FOR SAMPLING AIRBORNE MICRO-ORGANISMS
Filed Sept. 5, 1961 3 Sheets-Sheet 2

INVENTOR.
ARIEL A. ANDERSEN
ATTORNEY

March 31, 1964   A. A. ANDERSEN   3,127,329
METHOD AND APPARATUS FOR SAMPLING AIRBORNE MICRO-ORGANISMS
Filed Sept. 5, 1961   3 Sheets-Sheet 3

INVENTOR.
Ariel A. Andersen
BY

United States Patent Office 3,127,329
Patented Mar. 31, 1964

3,127,329
METHOD AND APPARATUS FOR SAMPLING AIRBORNE MICRO-ORGANISMS
Ariel A. Andersen, 1074 Ash Ave., Provo, Utah
Filed Sept. 5, 1961, Ser. No. 136,421
13 Claims. (Cl. 195—103.5)

This invention relates to an apparatus and a method for determining continuously the concentration, or the variation in concentration over a period of time, of microscopic airborne particles such as viable bacteria, or other microorganisms, or bacteriophage, or viruses. More particularly, the invention relates to an air sampling device which can be used to determine, continuously, the number of viable, bacterial particles, or other viable particles, per unit volume of air, at the time and point of sampling.

Specifically, the invention relates to a mechanism which can be used to determine the number of the particles bearing viable bacteria, or other microorganisms, or bacteriophages, or viruses in a continuous sampling of air, so that their concentration of said particles and the fluctuations in concentration is revealed.

More specifically, the invention relates to an air sampling instrument which, when air is passed through it at a selected known rate, removes the airborne particles from the sample of air by impacting them onto a rotating agar-coated cylinder or drum. The drum is rotated on a threaded shaft at a known, selected rate, by a synchronous motor. An axial movement is imparted to the drum as it rotates so that each revolution of the drum moves the drum longitudinally a specified amount (the width of one thread of the threaded shaft), usually ⅛ inch. The drum is mounted in an enclosed casing and air that is passed through the casing enters through a fixed or stationary nozzle positioned in the side of the casing and positioned to direct a jet of air against the outer surface of the moving agar coated drum. Any particles in the sample of air are distributed along the impaction line in accordance with their concentration in the air sampled. Since both a rotary and axial movement is imparted to the drum, the impaction line will extend many times around the drum, in the form of a helix, utilizing all of the cylindrical surface of the drum. Incubation of the agar-coated drum containing the collected microscopic particles causes each particle containing bacteria to develop into a colony that can be seen and counted. The number of colonies along a given length of the impaction line represents the number of particles bearing microorganisms in a certain volume of air, which can be calculated from the air flow rate and the drum rotation rate. Therefore, knowing the time when the device is turned on, the concentration of viable airborne bacterial, or other viable microbial particles, in the air at any given time during the period can be calculated.

The invention will be further described in connection with the accompanying drawings, in which:

FIG. 1 is a vertical sectional view through a device embodying the invention;

FIG. 2 is a plan view of the device of FIG. 1;

Figure 3:
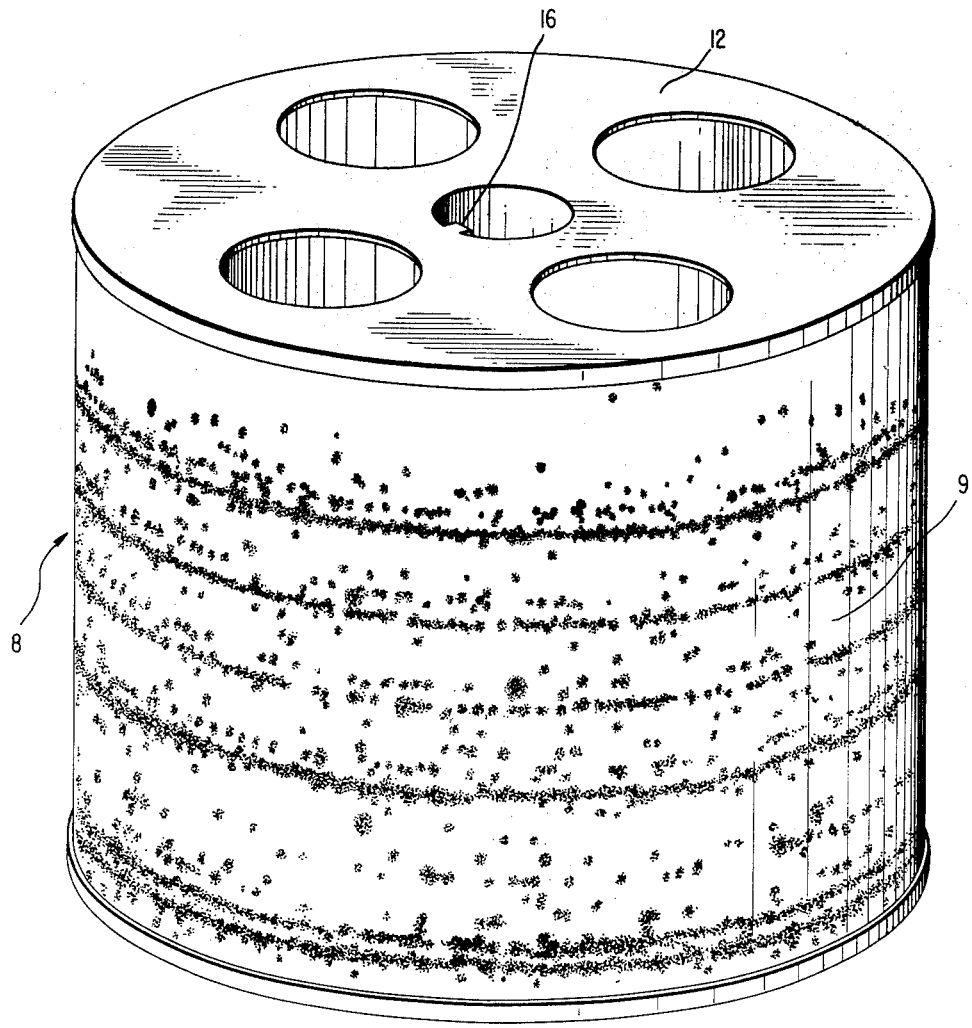
FIG. 3 is a perspective view of the agar-coated drum showing the colonies developed by incubation.
Figure 4:
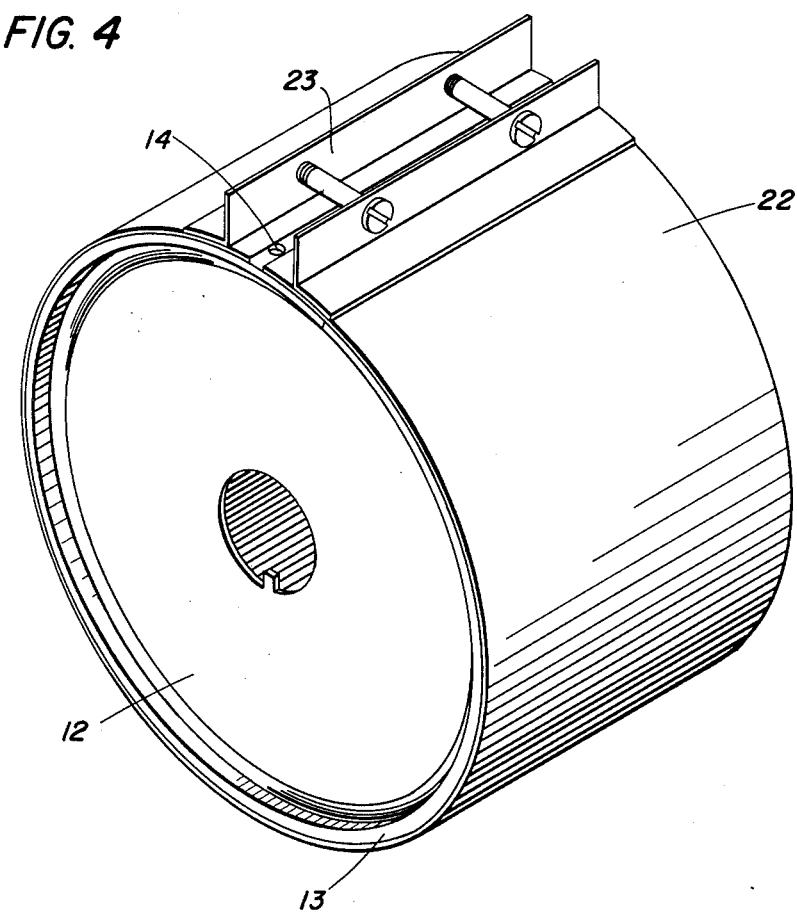
FIG. 4 is a perspective view illustrating the manner of molding the agar onto the outside of the drum.

Referring to the drawings, and first to FIG. 1, the apparatus of the invention comprises a casing 1 having an outwardly extending flange 2 at its upper end. The flange supports a cover 3. A sealing gasket 4 is interposed between the top of the casing and the underside of the cover, and the cover is held in sealing engagement with the flange by a bail 5, the ends of which engage beneath the flange 2, and by the mid-portion bearing on the top of an inverted V-shaped member 6 secured to the top of the cover. The bail also forms a handle which may be used for carrying the device.

A threaded shaft or stud 7 is fixedly secured to the central portion of the bottom of the casing 1 and extends upwardly for about one-half the height of the casing.

A cylinder or drum 8 having a nutrient agar layer 9 molded into a cylindrical pan 8' secured to the outer cylindrical surface of the drum is axially mounted on the threaded stud 7 for threaded movement therealong by means of a nut 10 fixedly secured to the lower end 11 of the drum and threadedly engaging the threads of the stud 7.

The upper end 12 of the drum 8 has a central opening 13 through which a drive shaft 14 extends. When the drum is at the upper end of the casing, as shown in FIG. 1, the drive shaft extends downwardly into the drum a distance substantially equal to the distance between the bottom of the drum and the bottom of the casing. To provide a driving connection between the drive shaft 14 and the drum, the drive shaft has a longitudinally-extending slot 15 into which a key tab 16 carried by the top of the drum extends. A stub shaft 17 is fixedly secured to the upper end portion of the drive shaft 14 and is connected through appropriate driving means to a synchronous motor 18, detachably secured to the cover 3.

From the device as so far described, it will be apparent that rotation of the drive shaft 14 will cause the drum 8 to rotate about the threaded stud 7 and simultaneously move axially in a vertical direction with respect thereto from its upper position, shown in FIG. 1, until the bottom of the drum approaches the bottom of the casing 1, with each revolution of the drum lowering it a distance equal to the width of one thread. Thus, if the stud has eight threads to the inch, each revolution will lower the drum ⅛ inch. As the bottom of the drum approaches the bottom of the casing the key tab 16 passes out of the lower end of the drive-shaft slot 14 and the driving connection between the drive shaft and the drum is broken, and further movement of the drum ceases.

To provide for the impaction of a jet of air against the agar-coated surface of the drum, the sidewall of the casing is provided with a nozzle 19 having a small orifice 20 extending therethrough, and extending normal to the facing portion of the drum. Since the outside diameter of the drum is only slightly less than the inside diameter of the casing, there is relatively little space between the inner end of the orifice 20 and the outer surface of the nutrient agar on the drum. Therefore, a stream of air passing through the orifice 20, will not have an opportunity to disperse laterally to any appreciable extent before striking the agar layer, and will impinge against the agar layer as a jet stream.

An outlet pipe 21 extends from the cover 3. The outlet pipe may be attached to a suction pump or the like (not shown) to induce the flow of a jet stream of air through the nozzle 19.

When the drum is in its upper position, shown in FIG. 1, and the suction pump and the motor 18 are started, air is drawn through the nozzle 19 as a jet stream which impinges against the agar nutrient layer on the drum, causing the particles carried thereby to be deposited, by impaction thereon. Since the drum will simultaneously be rotating and moving vertically downwardly in the casing in front of the nozzle 19, the airborne particles will be deposited on the agar surface of the moving drum in a long helical line extending many times around the drum from one end thereof to the other, at which time the drum disengages from the drive shaft. A drum with a diameter of 5.62 inches and a height of 3.75 inches will provide an impaction line of 460 inches.

The length of sampling time represented by a 460 inch impaction line depends on the timing motor selected to operate each device. Timing motors of a wide variety of speeds are available. Thus, the total sampling time could be anything from a few minutes to many hours. The timing motor, being detachably secured to the cover, is easily and quickly exchanged on the device. A timing motor is selected which is appropriate for the particular work to be done.

The total sampling time may be used as one continuous sample giving a complete continuous record of the concentration of viable microorganisms present in the air throughout the sampling period, or the total sampling time may be used to take many short samples. For example, if a timing motor were selected that had a speed of one revolution per minute, and the drum is rotated through 26 revolutions the device could take 26 one minute samples, one for each revolution of the drum. The 26 samples could be taken one after the other at one place or could be taken one at a time and at different place. For example, air samples for Staphylococci from each of 26 rooms in a hospital may be taken on one drum. In this respect the present device is similar to a movie camera which may take many shots on one reel of film.

One of the important features of the invention is the agar coated drum or cylinder on which viable, or other microscopic, airborne particles are collected by jet impaction continuously over an extended period and cultured to show continuously the concentration of these particles in the air being sampled.

The usual air sampler gives only the total number of particles for the entire sampling period and therefore does not indicate the actual concentration of particles or organisms of a moving bacterial cloud. The reason for this is that the ordinary sampling device is usually set in operation before the bacterial cloud reaches it and operates for some time after the bacterial cloud passes. This timing is necessary because it is not known precisely when the bacterial cloud is present. Therefore, the actual volume of the cloud sampled is not known and consequently the actual concentration of viable particles at any given time can not be calculated from the sampling data, nor can the time be determined when the cloud is present. Furthermore, the concentration of such a cloud increases from the edge to the center. Thus, the concentration of particles varies from point to point, and at any given point is not ascertainable from the results obtained with various types of samplers such as liquid impingers, filters, or impaction samplers such as a sieve sampler, or a sampler such as is disclosed in my Patent No. 3,001,914. The rate at which the bacterial particles enter these sampling devices is not ascertainable from the results. As distinguished from the above types of samplers, the device of the present invention indicates precisely when the cloud reaches the sampling point, how the concentration builds up and decreases, and exactly when the cloud is past.

Likewise, in aerosol chamber studies where the concentration of viable particles is decreasing, due to physical and biological decay, similar arguments may be used to show that various types of samplers will not yield the kind of data necessary to calculate the actual concentration at any given time. The average concentration for the whole sampling time is determined. The sampler described herein actually does yield, continuously, the data needed to calculate the concentration of viable particles at any given time at the point of sampling.

The molding of the nutrient agar layer onto the outer surface of the drum 8 may be accomplished by placing a band 22, FIG. 4, made either of plastic or sheet metal with a soft gasket material, such as neoprene, that will withstand autoclaving (steam sterilization), covering one side, loosely on the drum, about the pan 8', and the drum and band sterilized by autoclaving or other means. The band is then tightened by suitable clamping means 23 against the edges of end flanges of the pan which protrude approximately $\frac{3}{16}$ inch beyond the curved surface of the bottom of the pan, thus forming a mold cavity between the band and the bottom of the pan into which melted, sterile, nutrient agar is poured. After the agar medium has solidified the band is removed, the agar coated cylinder or drum is placed in the chamber and attached to the upper end of the threaded shaft or stud 7, the cover 3 with synchronous timing motor 18 and drive attached is put in place as shown in FIG. 1 (see FIGURE 4), and the apparatus is ready for collecting a sample or samples. Sampling begins by turning on simultaneously, the timing motor and the suction pump (vacuum pump or vacuum system) which is connected to the outlet 21. At the end of the sampling operation the timing motor and suction are shut off simultaneously and the collected sample (or samples) are incubated, right in the casing 1, if desired, to cause the collected particles to grow into visible, countable, colonies. The incubation time and temperature selected should be appropriate for the types of microorganisms sought. The visible colonies, FIG. 3, which develop during the incubation period, each from a viable particle, may be counted according to their position on the drum and time-concentration data calculated therefrom knowing the drum rotation rate, the airflow rate, and the time sampling began.

The time each particle is collected may be determined from the position of the colony that develops from it. The number of viable bacterial particles may be determined for each increment of time which also represents a known volume of air sampled.

This same apparatus and procedure with some modification may be used for sampling air for other microorganisms, bacteriophages and viruses. For the collection and identification of airborne bacteriophages the agar drum is seeded with the host strain of bacteria. Plaques develop on the agar drum instead of bacterial colonies. For virus collection and identification the agar is layered with tissue cells.

I claim:

1. An apparatus for separating and collecting microscopic, airborne particles which comprises a drum, a layer on the cylindrical surface of said drum capable of retaining microscopic particles impacted thereagainst, nozzle means positioned adjacent to the cylindrical surface of said drum for directing a jet of air thereagainst, and means for simultaneously causing relative rotational and translational movement between said cylindrical surface of the drum and said nozzle means.

2. An apparatus as set forth in claim 1 in which said nozzle is stationary and which includes means for simultaneously imparting to said drum rotary and axial motions with respect to the axis thereof.

3. An apparatus as set forth in claim 1 including a casing in which said drum is mounted having said nozzle means attached to a wall thereof, said nozzle means having an orifice extending therethrough for the passage of air with one end thereof terminating adjacent the circumferential surface of the drum having said layer thereon.

4. An apparatus as set forth in claim 3 including a shaft fixedly secured to said casing and extending inwardly from adjacent one wall thereof, and in which said drum is mounted on said shaft for rotary and axial movement with respect thereto.

5. An apparatus as set forth in claim 4 in which said shaft is threaded, one end of said drum has a threaded engagement with said threaded shaft, and which includes a drive shaft which extends through the other end of said drum, and said drive shaft and drum are connected by a key-and-slot arrangement, whereby said drum is nonrotatably secured to said shaft but can move longitudinally with respect thereto, and means for rotating said drive shaft.

6. An apparatus as set forth in claim 1 in which said layer is agar.

7. In the method of separating and collecting microscopic particles carried by air in which a jet of air containing such particles is directed against a surface which will retain such particles on impaction; the improvement in which said surface is of cylindrical contour, and simultaneously said surface and jet of air are caused to move rotationally and translationally relative to one another.

8. The method of claim 7 in which said surface is rotationally and translationally moved relative to said air jet.

9. The method of sampling air to determine the concentration of viable micro-organisms carried thereby which comprises directing a jet of air carrying such micro-organisms against a cylindrical nutrient surface which will retain such micro-organisms on impaction and simultaneously moving such surface rotationally past said jet and translationally with respect thereto, whereby micro-organisms carried by the air jet are deposited on said cylindrical surface in a helical line extending therearound, and incubating said deposited micro-organisms to cause them to grow into visible, countable microbial colonies, the number and position of which with respect to said line, represent the concentration of micro-organisms in said jet of air and the time when collected, respectively.

10. The method of sampling air as set forth in claim 9 in which the nutrient surface is an agar surface.

11. The method of sampling air to determine the concentration of bacteria carried thereby which comprises directing a jet of air carrying bacteria against a cylindrical nutrient surface which will retain bacteria on impaction, simultaneously moving such surface rotationally past said jet and translationally with respect thereto, whereby bacteria carried by said air jet are deposited on said cylindrical surface in a helical line extending therearound, and incubating said deposited bacteria to cause them to grow into visible, countable bacterial colonies, the number and position of which with respect to said line represent the concentration of bacteria in said jet of air and the time when collected, respectively.

12. The method of sampling air to determine the concentration of bacteriophages carried thereby, which comprises directing a jet of air carrying bacteriophages against a cylindrical nutrient surface which will retain bacteriophages on impaction and which is seeded with a host strain of bacteria, simultaneously moving such surface rotationally past said jet and translationally with respect thereto, whereby bacteriophages carried by said air jet are deposited on said seeded, nutrient cylindrical surface in a helical line extending therearound, and subjecting said seeded, nutrient surface onto which the bacteriophages have been collected to incubation to cause the particles containing bacteriophage to grow into visible, countable plaques, the number and position of which with respect to said line represent the concentration of phage particles in said jet of air and the time collected, respectively.

13. The method of sampling air to determine the concentration of viruses carried thereby which comprises directing a jet of air carrying viruses against a cylindrical nutrient surface containing tissue cells and which will retain viruses on impaction, simultaneously moving said surface rotationally past said jet and translationally with respect thereto, whereby viruses carried by said air jet are deposited on said cylindrical surface in a helical line extending therearound, and incubating said deposited viruses to cause them to grow into colonies which are visible and countable, the number and position of which with respect to said line represent the concentration of viruses in said jet of air and the time when collected, respectively.

References Cited in the file of this patent
UNITED STATES PATENTS 2,894,877    Sinden _____ July 14, 1959
3,001,914    Andersen _____ Sept. 26, 1961